(12) United States Patent
Renke et al.

(10) Patent No.: US 10,661,473 B2
(45) Date of Patent: May 26, 2020

(54) INTEGRAL COMPOSITE SHUTTERING PANEL AND MONOLITHIC WALL BUILDING SYSTEM

(71) Applicant: Centroplexus Innovations Inc., Vancouver (CA)

(72) Inventors: Peter Renke, Richmond (CA); Chester M. Chong-Walden, Vancouver (CA)

(73) Assignee: Centroplexus Innovations Inc., Vancouver (CA)

( * ) Notice: Subject to any disclaimer, the term of this patent is extended or adjusted under 35 U.S.C. 154(b) by 0 days.

(21) Appl. No.: 15/461,604

(22) Filed: Mar. 17, 2017

(65) Prior Publication Data

US 2017/0268232 A1    Sep. 21, 2017

Related U.S. Application Data

(60) Provisional application No. 62/310,284, filed on Mar. 18, 2016.

(51) Int. Cl.
*E04B 2/00* (2006.01)
*E04B 2/70* (2006.01)
(Continued)

(52) U.S. Cl.
CPC ............... *B27N 3/08* (2013.01); *B27N 3/04* (2013.01); *E04B 2/707* (2013.01); *E04C 2/16* (2013.01); *E04C 2/46* (2013.01); *B27N 3/02* (2013.01); *E04B 1/6125* (2013.01); *E04B 1/6145* (2013.01); *E04B 1/7604* (2013.01);
(Continued)

(58) Field of Classification Search
CPC ..... E04C 2/26; E04C 2/46; B27N 3/08; E04B 2/721; E04B 1/18
See application file for complete search history.

(56) References Cited

U.S. PATENT DOCUMENTS 3,604,174 A * 9/1971 Nelson, Jr. ............... E04C 2/06
                                                    52/601
4,835,928 A * 6/1989 Scott ..................... E04B 1/4178
                                                    52/426

(Continued)

FOREIGN PATENT DOCUMENTS

CA        2875209 A1    1/2014
DE      19831659 A1    1/2000
(Continued)

*Primary Examiner* — Basil S Katcheves
*Assistant Examiner* — Omar F Hijaz
(74) *Attorney, Agent, or Firm* — The Webb Law Firm

(57) ABSTRACT

A composite wall panel having a front surface, a rear surface, and side surfaces extending therebetween is provided. The panel includes a cured composition of pieces of cellulose and/or chaff and at least one binder. A wall assembly is also provided. The assembly includes: a frame including a plurality of linearly arranged elongated studs having a top end, a bottom end, and a first longitudinal side and a second longitudinal side extending between the respective ends; a plurality of interconnected wall panels mounted to the first side of the elongated studs of the frame to form a first wall portion; a plurality of interconnected panels mounted to the second side of the elongated studs to form a second wall portion; and an insulating layer inserted within a cavity between the first wall portion and the second wall portion.

13 Claims, 9 Drawing Sheets

(51) Int. Cl.
*B27N 3/04* (2006.01)
*E04C 2/16* (2006.01)
*E04B 1/74* (2006.01)
*E04B 1/61* (2006.01)
*E04B 2/86* (2006.01)
*B27N 3/02* (2006.01)
*E04B 1/76* (2006.01)
*B27N 3/08* (2006.01)

(52) U.S. Cl.
CPC ........... *E04B 2/86* (2013.01); *E04B 2001/745* (2013.01); *Y02A 30/245* (2018.01)

(56) References Cited

U.S. PATENT DOCUMENTS

| | | |
|---|---|---|
| 4,940,364 A | 7/1990 | Dlugosz |
| 5,232,779 A | 8/1993 | Spehner |
| 6,641,909 B1 | 11/2003 | Wasylciw |
| 8,070,877 B2 | 12/2011 | Freudiger |
| 8,621,807 B2 | 1/2014 | Charvoz |
| 9,551,147 B2 * | 1/2017 | Marstein .................... E04B 2/46 |
| 2002/0108336 A1 * | 8/2002 | Maimon .................. E04C 2/049 52/309.9 |
| 2005/0188649 A1 * | 9/2005 | Hagen, Jr. ............. B29C 44/186 52/782.1 |
| 2006/0096214 A1 | 5/2006 | Groschup et al. |
| 2006/0174577 A1 * | 8/2006 | O'Neil .................. E04B 1/6145 52/586.2 |
| 2006/0179761 A1 * | 8/2006 | Burg .................... E04L 32/7453 52/481.1 |
| 2008/0099122 A1 | 5/2008 | Andersen et al. |
| 2011/0300386 A1 | 12/2011 | Pardue, Jr. |
| 2013/0205703 A1 * | 8/2013 | Baumer .................... C04B 28/10 52/572 |
| 2014/0123583 A1 * | 5/2014 | Arriola Serrano ...... E04L 32/06 52/405.1 |
| 2014/0302280 A1 | 10/2014 | Gautam et al. |
| 2015/0101276 A1 * | 4/2015 | Lohmann ............. E04L 31/7675 52/404.1 |
| 2015/0218049 A1 | 8/2015 | Andersen et al. |
| 2016/0208489 A1 * | 7/2016 | Gibson .................. E04C 2/284 |

FOREIGN PATENT DOCUMENTS

| | | |
|---|---|---|
| DE | 20311928 U1 | 11/2003 |
| EP | 2497870 A1 | 9/2012 |
| FR | 2796975 A1 | 2/2001 |
| GB | 530029 | 12/1940 |
| GB | 708751 | 5/1954 |
| WO | 2008104772 A1 | 9/2008 |

* cited by examiner

FIG. 2
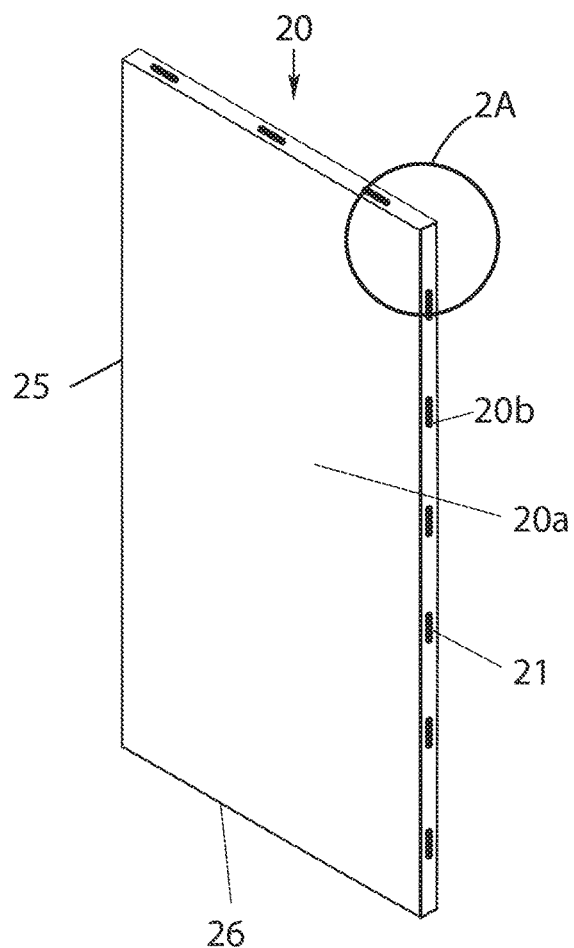
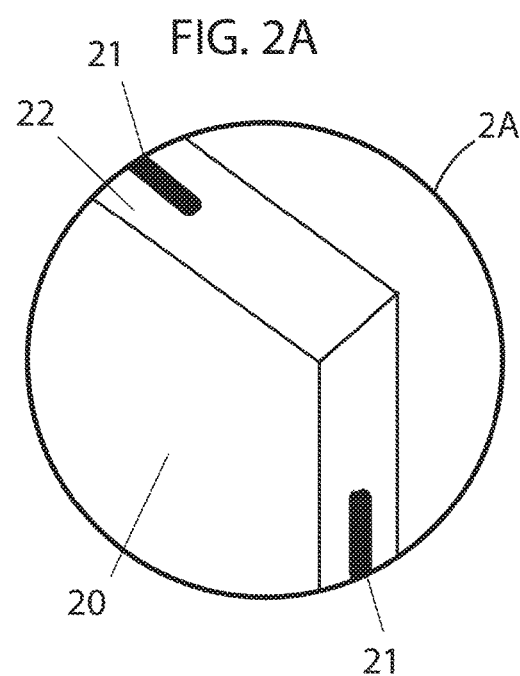
FIG. 2A
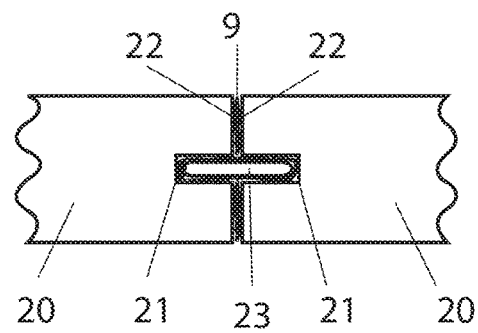
FIG. 2B
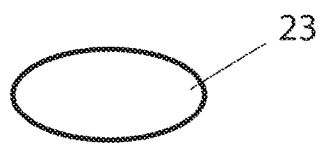
FIG. 2C

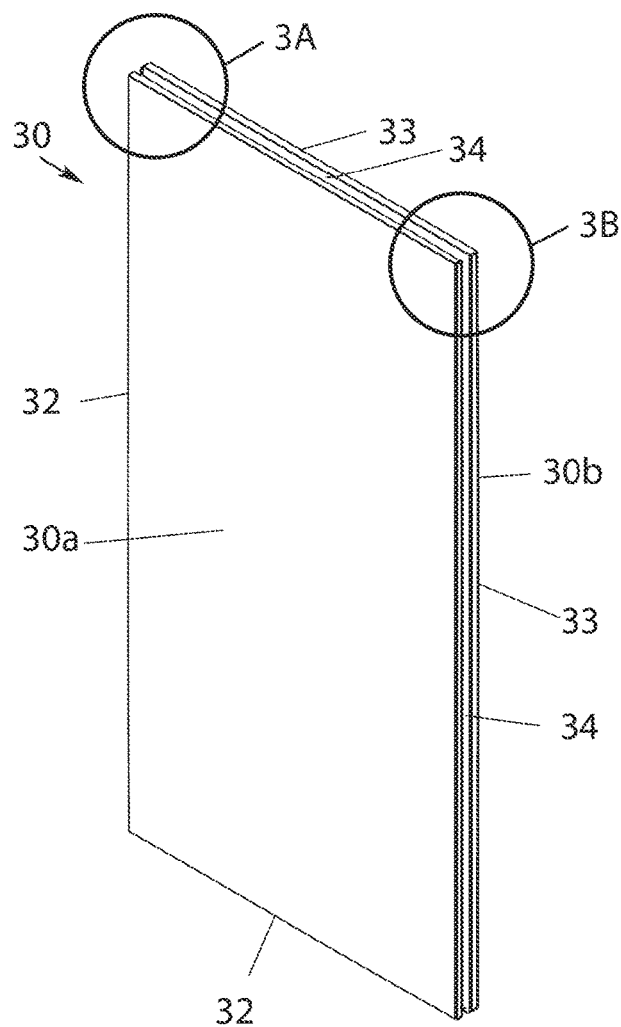
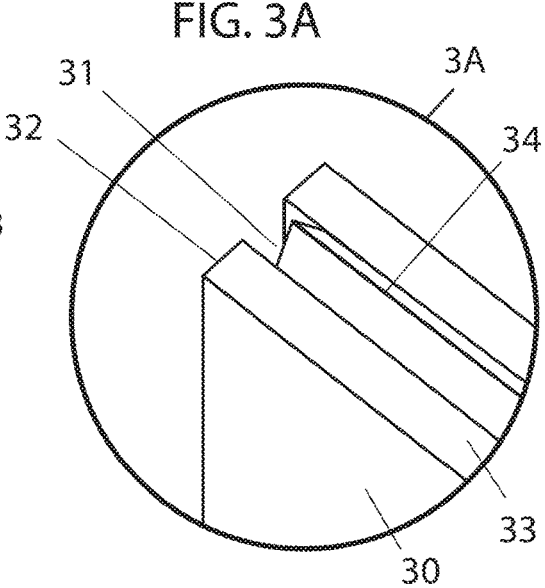
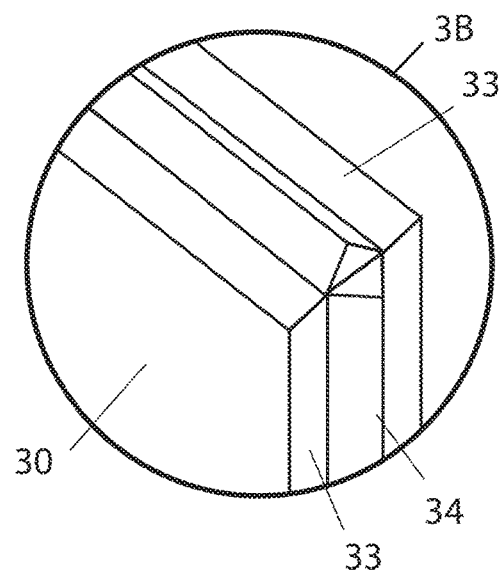
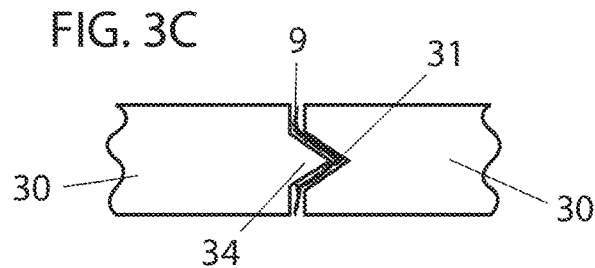
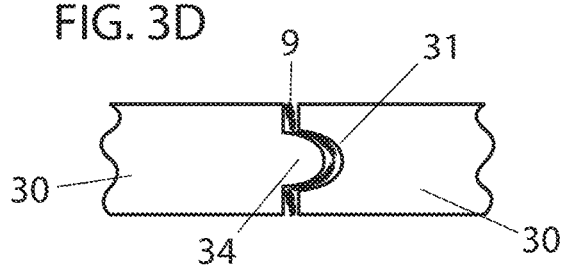

FIG. 5
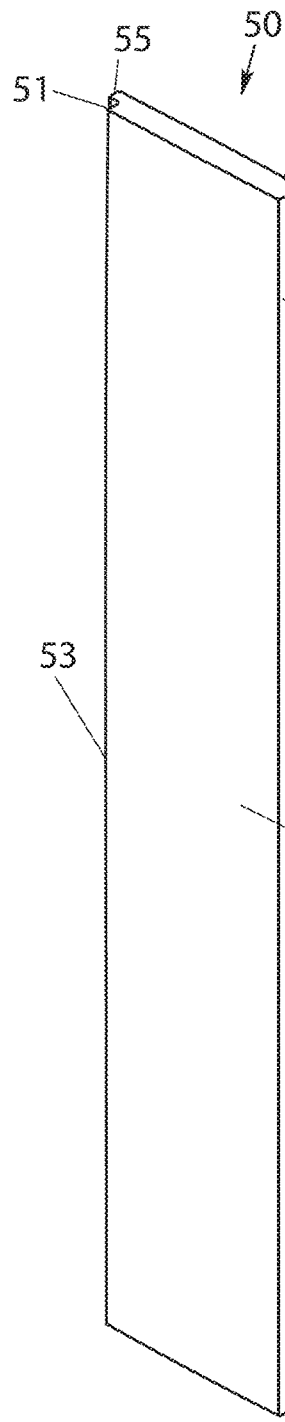
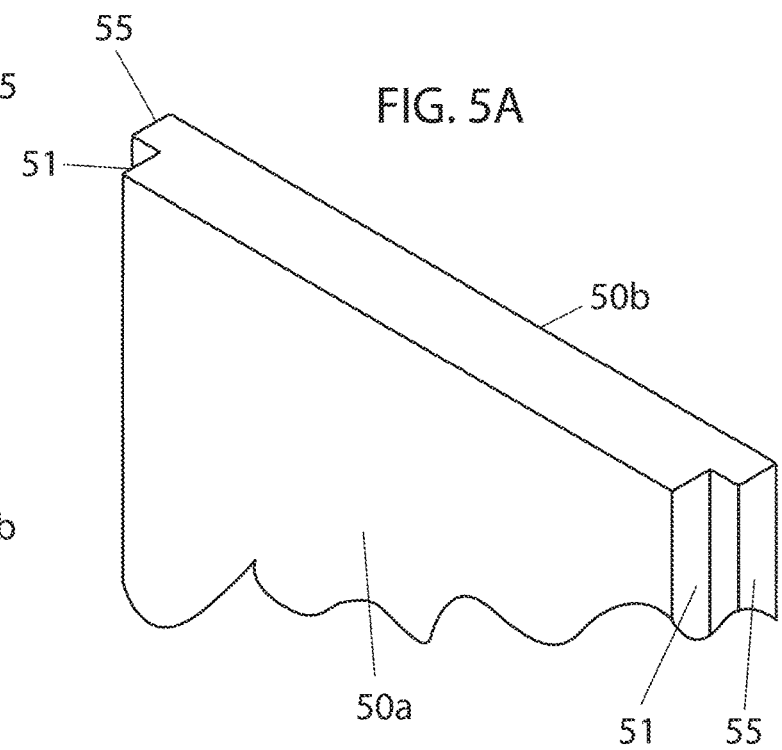
FIG. 5A
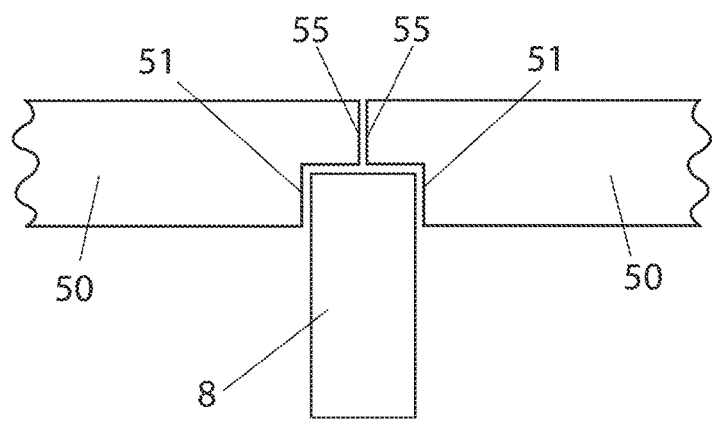
FIG. 5B

INTEGRAL COMPOSITE SHUTTERING PANEL AND MONOLITHIC WALL BUILDING SYSTEM

CROSS REFERENCE TO RELATED APPLICATION

This application claims priority to United States Provisional Application No. 62/310,284 filed Mar. 18, 2016, which is incorporated herein by reference in its entirety.

BACKGROUND OF THE INVENTION

Field of the Invention

The present invention relates to construction materials for creating monolithic biocomposite walls or ceilings, as well as processes for preparing and using such materials, and, more particularly, to a prefabricated shuttering panel for creating cast-in-place mass walls.

Description of the Related Art

Production of walls using bioaggregates formed from dried and processed cellulose fibers and binder, such as hemp and lime, hemp-lime or hemperete, is a well-known construction technique. Use of such bioaggregates is often desirable due to the natural, non-toxic composition, thermal performance, hygrometric regulation, phonic qualities, and fire and pest resistance of the bioaggregate materials.

A traditional method for casting a biocompatible wall, referred to as slip-forming, involves preparing a wet mineralized cellulose (e.g., hemperete) mixture in situ and filling two opposing formworks or shutterings attached directly to, or offset from, a framing of the structure being built. This slip-forming method of filling or pouring between formworks requires tamping down the bioaggregate at the facing surface of the formwork to increase the material density of the wall structure, which enhances the integrity of the wall. In some cases, it is desirable to leave the central portion or mass of the wall in a less dense state for greater insulating value. The formwork is removed once the bioaggregate has set into a hardened state. The time for setting the bioaggregate is usually 24 to 48 hours, to allow the binder in the wall to partially activate, allowing the bioaggregate to substantially harden. After the formwork is removed, drying and curing the hemperete can take many weeks or months. The final product created from this process is a monolithic biocomposite wall material surrounding the structural building framing.

This traditional slip-forming process is slow due to installing and removing the temporary formwork, requires special considerations while framing, and creates long time delays in order to have the bioaggregate material dry out enough to allow final finishing work to begin on the interior and exterior wall surfaces. It is also time-consuming and difficult to produce a wall with a variety and/or gradient of material densities between the surface and interior mass of a wall. However, as previously discussed, a wall with a dense surface and less dense internal mass is desirable to enhance both integrity and thermal resistance of the structure.

To solve some of these material drawbacks, other construction products incorporate bioaggregates, like hemperete, into various forms including prefabricated bricks, blocks, structural blocks, and completely custom structurally insulated panels (SIP). All of these products are single-density biocomposites.

An improved and more universal factory-produced biocomposite product and wall building system adapted for use with current wood-framing construction methods is needed. Such a factory-produced biocomposite wall would allow for a larger range of building possibilities, while reducing the time required for assembly and drying. The panels, walls, and wall systems disclosed herein are intended to address these challenges.

SUMMARY OF THE INVENTION

Generally provided is an improved composite shuttering panel and monolithic wall building system. Accordingly, the present invention is directed to construction materials for creating structurally monolithic walls, as well as to processes for producing and using the construction material in an advanced wall system. The materials and processes improve upon traditional methods for building biocomposite walls or ceilings through the use of natural biocomposites in both pre-fabricated panels and wet-mixed formats. In some examples, the panels and wet-mix materials are configured to fully integrate after installation to create dual-density, non-load bearing monolithic walls.

According to a preferred and non-limiting embodiment or aspect, a composite wall panel includes: a front surface; a rear surface; and side surfaces extending between the front and rear surfaces. The wall panel includes a cured composition formed from pieces of cellulose and/or chaff and at least one binder.

According to a preferred and non-limiting embodiment or aspect, a wall assembly includes a frame having a plurality of linearly arranged elongated studs having a top end, a bottom end, and a first longitudinal side and a second longitudinal side extending between the respective ends. The wall assembly also includes a plurality of interconnected panels mounted to the first side of the elongated studs of the frame to form a first wall portion, a plurality of interconnected panels mounted to the second side of the elongated studs to form a second wall portion, and an insulating layer inserted within a cavity between the first wall portion and the second wall portion. The insulating layer is fused to at least a portion of the first wall portion and the second wall portion. The insulating layer includes pieces of cellulose and/or chaff and at least one binder. Each of the interconnected panels has a front surface forming an exterior face of the wall portion, a rear surface mounted to one or more of the elongated studs, and side surfaces extending between the front and rear surfaces. The side surfaces of the panels are connected to side surfaces of adjacent wall panels to form the first and second wall portions. The wall panels include a cured composition formed from pieces of cellulose and/or chaff and at least one binder.

According to a preferred and non-limiting embodiment or aspect, a method of manufacturing composite wall panels for forming a wall assembly is provided. The method includes: providing one or more panel-shaped molds; preparing a mixture comprising pieces of cellulose and/or chaff and at least one binder; pouring the mixture into the one or more molds; applying compression to the mixture; and curing the mixture to form wall panels.

According to a preferred and non-limiting embodiment or aspect, a method of forming a modular wall includes the step of providing a frame. The frame includes a plurality of linearly-arranged elongated studs having a bottom end, a top end, and a first longitudinal side and a second longitudinal side extending therebetween. The method also includes mounting a plurality of wall panels to the first side of the elongated studs to form a first wall portion and mounting a plurality of wall panels to the second side of the elongated studs to form a second wall portion. The plurality of panels each have a first insulating value. The method further includes depositing a composition formed from cellulose chaff and at least one binder to a cavity between the first wall portion and the second wall portion to amalgamate with the plurality of wall panels, thereby forming an inner portion having a second insulating value. The second insulating value is greater than the first insulating value. The wall panels comprise a front surface, a rear surface, and side surfaces extending between the front and rear surfaces. The panels further comprise a cured composition of cellulose and/or chaff and at least one binder.

According to a preferred and non-limiting embodiment or aspect, a non-load bearing wall delineating panel component formed from a cured fiber reinforced plant-based cellulose chaff, lime, and cementitious and/or binding agents is provided. The panel includes a parallel and dimensionally equal front surface and rear surface, a parallel and dimensionally equal first end surface and second end surface, a uniform thickness defined by an exterior surface defining a wall, and an interior surface contacting a wall structural element. To form the wall, standardized panels are interconnected to form an interior wall surface affixable to a common interior wall structural element and an opposing exterior wall surface affixable to the common exterior wall structural element.

According to a preferred and non-limiting embodiment or aspect, a method of forming a contiguous and structurally monolithic wall section includes attaching an assembly of interior wall panels to an interior aspect of a wall structural element resulting in a permanent formwork shuttering and interior wall surface; attaching an assembly of exterior wall panels to an exterior aspect of a wall structural element resulting in a permanent formwork shuttering and exterior wall surface; and filling a resulting internal void space between the interior wall panels and the exterior wall panels with compatible structural elements or a combination of structural and non-structural elements to form the contiguous wall section.

Further preferred and non-limiting aspects or embodiments of the present invention will now be described in the following numbered clauses:

Clause 1: A composite wall panel, comprising: a front surface; a rear surface; and side surfaces extending between the front and rear surfaces, wherein the wall panel comprises a cured composition comprising pieces of cellulose and/or chaff and at least one binder.

Clause 2: The composite wall panel of clause 1, wherein the cured composition further comprises cellulose and/or chaff reinforcing fibers, and wherein at least a portion of the reinforcing fibers have an average length of at least two times the average length of the pieces of the cellulose and/or chaff.

Clause 3: The composite wall panel of clause 2, wherein the reinforcing fibers are dispersed within the panel to form a fiber mesh or matrix.

Clause 4: The composite wall panel of clause 2 or clause 3, wherein the reinforcing fibers comprise at least one of the following: hemp fibers, kenaf fibers, flax fibers, grass, straw, wood bark, glass fibers, or any combination thereof.

Clause 5: The composite wall panel of any of clauses 2-4, wherein the pieces of the cellulose and/or the chaff have an average length of between about 2 mm and about 25 mm, and the reinforcing fibers have an average length of between about 4 mm and about 80 mm.

Clause 6: The composite wall panel of any of clauses 1-5, wherein the pieces of cellulose and/or the chaff comprise fragmented woody material obtained from at least one of the following: hemp, straw, kenaf, flax plants, grass, wood bark, or any combination thereof.

Clause 7: The composite wall panel of any of clauses 1-6, wherein the binder comprises at least one of the following: hydraulic lime, hydrated lime, silica, microsilica, calcium silica hydrate, pumicite, kaolin, metakaolin, pozzolans, Portland cement, magnesium oxide, or any combination thereof.

Clause 8: The composite wall panel of any of clauses 1-7, wherein the wall panel has a thickness of about 1 inch to about 4 inches, and a ratio of length and width of at least one of the front surface and the rear surface is about 2 to 1.

Clause 9: The composite wall panel of any of clauses 2-8, wherein reinforcing fibers are about 1% to about 15% of the total cellulose and/or chaff composition of the panel.

Clause 10: The composite wall panel of any of clauses 1-9, wherein the wall panel has a density of about 250 to about 450 kg/m$^3$.

Clause 11: The composite wall panel of any of clauses 1-10, wherein at least one of the side surfaces of the panel comprises a longitudinal groove configured to receive an elongated connector for connecting the wall panel to another panel.

Clause 12: The composite wall panel of any of clauses 1-11, wherein at least one of the side surfaces comprises a rabbet extending along at least a portion thereof configured to receive a corresponding rabbet of an adjacent wall panel for aligning the adjacent panels.

Clause 13: A wall assembly comprising: a frame comprising a plurality of linearly arranged elongated studs having a top end, a bottom end, and a first longitudinal side and a second longitudinal side extending between the respective ends; a plurality of interconnected panels mounted to a first side of the elongated studs of the frame to form a first wall portion; a plurality of interconnected panels mounted to a second side of the elongated studs to form a second wall portion; and an insulating layer inserted within a cavity between the first wall portion and the second wall portion fused to at least a portion of the first wall portion and the second wall portion, the insulating layer comprising pieces of cellulose and/or chaff and at least one binder, wherein each of the interconnected panels has a front surface forming an exterior face of the wall portion, a rear surface mounted to one or more of the elongated studs, and side surfaces extending between the front and rear surfaces, the side surfaces being connected to side surfaces of adjacent wall panels to form the first and second wall portions, and wherein the wall panels comprise a cured composition comprising pieces of cellulose and/or chaff and at least one binder.

Clause 14: The assembly of clause 13, wherein at least one of the side surfaces of the wall panels comprises a longitudinal groove, and wherein the assembly further comprises an elongated connector mounted within the grooves of adjacent interconnected panels to form a secure connection between the adjacent panels.

Clause 15: The assembly of clause 14, further comprising a binder at least partially disposed within the groove for mounting the elongated connector within the groove.

Clause 16: The assembly of any of clauses 13-15, wherein the side surfaces of the wall panels comprise a rabbet extending along a longitudinal edge thereof, and wherein portions of the elongated studs of the frame are received within the rabbet.

Clause 17: The assembly of any of clauses 13-16, wherein the side surfaces of some of the wall panels comprise at least one groove and the side surfaces of other wall panels comprise at least one tongue, and wherein the at least one tongue of the wall panels are received within the at least one groove of an adjacent wall panel to align a wall panel to an adjacent wall panel.

Clause 18: The assembly of clause 17, wherein the at least one tongue comprises a V-shaped or U-shaped tongue configured to receive a corresponding V-shaped or U-shaped groove.

Clause 19: The assembly of any of clauses 13-18, wherein a density of the insulating layer is less than a density of at least one of the wall panels.

Clause 20: A method of manufacturing composite wall panels for forming a wall assembly, comprising: providing one or more panel-shaped molds; preparing a mixture comprising pieces of cellulose and/or chaff and at least one binder; pouring the mixture into the one or more molds; applying compression to the mixture; and curing the mixture to form wall panels.

Clause 21: The method of clause 20, further comprising forming a groove along at least a portion of a side surface of at least one of the molded panels configured for aligning a panel with an adjacent panel when connected together to form a portion of the wall assembly.

Clause 22: The method of clause 20 or clause 21, further comprising: providing a frame comprising a plurality of linearly arranged elongated studs having a bottom end, a top end, and a first longitudinal side and a second longitudinal side extending therebetween; mounting a plurality of the wall panels to the first side of the elongated studs to form a first wall portion; mounting a plurality of the wall panels to the second side of the elongated studs to form a second wall portion, the plurality of panels having a first insulating value; and depositing a composition comprising pieces of cellulose and/or chaff and at least one binder to a cavity between the first wall portion and the second wall portion to amalgamate with the plurality of wall panels, thereby forming an inner portion having a second insulating value, the second insulating value being greater than the first insulating value.

Clause 23: The method of clause 22, wherein mounting the plurality of wall panels comprises: mounting a first wall panel to one or more of the elongated studs of the frame; inserting an elongated connector in a longitudinal groove extending along a side surface of the first wall panel; and mounting a second wall panel to at least one of the elongated studs, such that the elongated connector is received within a corresponding groove extending along a side surface of the second wall panel to align the first wall panel to the second wall panel.

Clause 24: A method of forming a modular wall comprising: providing a frame, the frame comprising a plurality of linearly arranged elongated studs having a bottom end, a top end, and a first longitudinal side and a second longitudinal side extending therebetween; mounting a plurality of wall panels to the first side of the elongated studs to form a first wall portion; mounting a plurality of wall panels to the second side of the elongated studs to form a second wall portion, the plurality of panels having a first insulating value; and depositing a composition comprising cellulose chaff and at least one binder to a cavity between the first wall portion and the second wall portion to amalgamate with the plurality of wall panels, thereby forming an inner portion having a second insulating value, the second insulating value being greater than the first insulating value, wherein the wall panels comprise a front surface; a rear surface; and side surfaces extending between the front and rear surfaces, and a cured composition of cellulose and/or chaff and at least one binder.

Clause 25: The method of clause 24, wherein mounting the plurality of wall panels comprises mounting a first wall panel to one or more of the elongated studs of the frame, inserting an elongated connector in a longitudinal groove extending along a side surface of the first wall panel; and mounting a second wall panel to at least one of the elongated studs, such that the elongated connector is received within a corresponding groove extending along a side surface of the second wall panel to align the first wall panel to the second wall panel.

Clause 26. A non-load bearing wall delineating panel component of cured fiber reinforced plant-based cellulose chaff, lime and cementitious or binding agents, wherein the panel comprises: a parallel and dimensionally equal front surface and rear surface; a parallel and dimensionally equal first end surface and second end surface; a uniform thickness defined by an exterior surface defining a wall and an interior surface contacting a wall structural element, and wherein standardized panels are interconnected to form an interior wall surface affixable to a common interior wall structural element and an opposing exterior wall surface affixable to the common exterior wall structural element.

Clause 27: The wall panel component of clause 26, wherein the panel contains organic and or inorganic matrix dispersed or embedded woven fiber reinforcement for strength and dimensional stability to a standardized dimension or series of dimensions.

Clause 28: The wall panel component of clause 26 or clause 27, wherein the front surface and rear surface are equal in length or a divisible proportion to the dimensionally equal first end surface and second end surface.

Clause 29: The wall panel component of any of clauses 26-28, wherein the panel has universally compatible butt joining features on all end surfaces, or pairing and orientation of panels designed to incorporate compatible joining features.

Clause 30: The wall panel component of clause 29, wherein the joining feature is compatible to receive compatible adhesives or binding agents.

Clause 31: The wall panel component of any of clauses 26-30, wherein the exterior surface incorporates features to enhance bonding of adhesives and finishing compounds.

Clause 32: The wall panel component of any of clauses 26-31, wherein the exterior surface is grooved.

Clause 33: The wall panel component of clause 27, wherein the exterior surface incorporates projections of intrinsic fibers or integral permanent scaffolding from the matrix of the panel.

Clause 34: The wall panel component of any of clauses 26-33, wherein the interior surface has features to enhance fusion or crystallization to a compatible internal wall matrix.

Clause 35: The wall panel component of clause 26, wherein the interior surface is grooved.

Clause 36: The wall panel component of clause 27, wherein the interior surface incorporates projections of intrinsic fibers or integral permanent scaffolding from the matrix of the panel.

Clause 37: A method of forming a contiguous and structurally monolithic wall section, comprising: attaching an assembly of interior wall panels to an interior aspect of a wall structural element resulting in a permanent formwork shuttering and interior wall surface; attaching an assembly of exterior wall panels to an exterior aspect of a wall structural element resulting in a permanent formwork shuttering and exterior wall surface; and filling a resulting internal void space between the interior wall panels and the exterior wall panels with compatible structural elements or a combination of structural and non-structural elements to form the contiguous wall section.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Some of the advantages and features of the preferred aspects or embodiments of the invention have been summarized hereinabove. These embodiments, along with other potential aspects or embodiments of the invention, will become apparent to those skilled in the art when referencing the following drawings in conjunction with the detailed descriptions as they relate to the figures.

FIG. 2 is an isometric perspective view of another embodiment of a shuttering panel having slots for biscuit connections around an entire edge thereof according to an aspect of the disclosure;

FIG. 2A is a perspective view of a portion of the panel of FIG. 2 enclosed by circle 2A;

FIG. 2B is a top view of a portion of a wall including two panels connected together by a biscuit filling slots of each panel;

FIG. 2C is a top view of a solid biscuit according to an aspect of the disclosure;

FIG. 3 is an isometric perspective view of another embodiment of a shuttering panel having a V-groove and V-tongue connection along edges;

FIG. 3A is a perspective view of a portion of the panel of FIG. 3 enclosed by circle 3A including a V-groove on the back edge and V-tongue on the top edge thereof;

FIG. 3B is a perspective view of a portion of the panel of FIG. 3 enclosed by circle 3B including a V-tongue on both the top and front edges thereof;

FIG. 3C is a top view of a portion of a wall including two panels connected together with a V-tongue of one panel inserted in a V-groove of the other panel according to an aspect of the disclosure;

FIG. 3D is a top view of a portion of a wall including two panels connected together with a U-tongue of one panel inserted into a U-groove of the other panel according to an aspect of the disclosure;

FIG. 5 is an isometric perspective view of another embodiment of a shuttering panel having a rabbet profile along the two longest edges thereof according to an aspect of the disclosure;

FIG. 5A is a perspective view of a top portion of the panel of FIG. 5;

FIG. 5B is a top view of a wall including panels of FIG. 5 and a framing stud connected together illustrating how the rabbet profile fits between framing studs of a wall;

DESCRIPTION OF THE INVENTION

Figure 1:
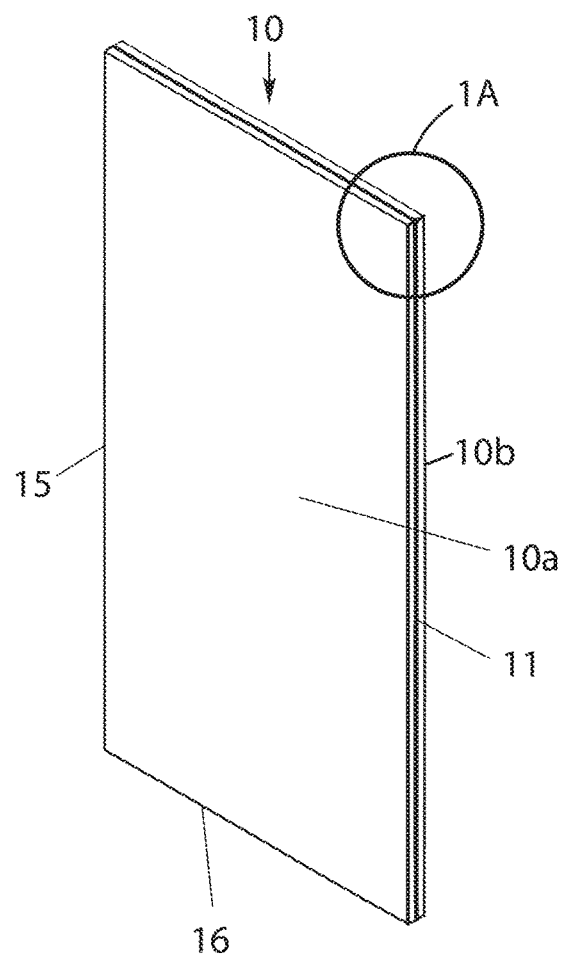
FIG. 1 is an isometric perspective view of a shuttering panel with a groove around an entire edge thereof according to an aspect of the disclosure.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step or stage sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

For the purposes of this specification, unless otherwise indicated, all numbers expressing quantities of ingredients, reaction conditions, dimensions, physical characteristics, and so forth used in the specification and claims are to be understood as being modified in all instances by the term "about." Unless indicated to the contrary, the numerical parameters set forth in the following specification and attached claims are approximations that can vary depending upon the desired properties sought to be obtained by the present invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all subranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

The present disclosure is generally directed to pre-fabricated composite wall panels formed from an aggregate of fibrous materials and binders for use in structures requiring natural wall materials. This disclosure is also directed to methods of wall and/or ceiling construction using the composite panels. In some examples, the pre-fabricated panels and constructed walls have favorable properties including thermal and acoustic insulating, fire and/or flame retardant, humidity regulating, and pest-resistant properties. For example, surface(s) of the panels may be hydroscopic but breathable to manage humidity within a space. Further, the wall-building system disclosed herein can be used to install strong factory-produced biocomposite flat panels of uniform thickness, which can be used as a permanent shuttering.

Exemplary Shuttering Panels

FIGS. 1-5 depict preferred and non-limiting embodiments or aspects of biocomposite shuttering panels 10, 20, 30, 40, 50 formed from a bioaggregate material. The panel 10, 20, 30, 40, 50 can include a front or inner surface 10*a*, 20*a*, 30*a*, 40*a*, 50*a*, a rear or outer surface 10*b*, 20*b*, 30*b*, 40*b*, 50*b*, and side surfaces or edges 15, 16 (shown in FIG. 1), extending between the inner surface 10*a*, 20*a*, 30*a*, 40*a*, 50*a* and the outer surface 10*b*, 20*b*, 30*b*, 40*b*, 50*b*. As discussed in detail herein, the panel 10, 20, 30, 40, 50 is generally formed from a bioaggregate composition comprising a cured composition of pieces of cellulose and/or chaff and at least one binder. Optionally, the panel 10, 20, 30, 40, 50 may also include cellulose and/or chaff reinforcing fibers.

For example, panels 10, 20, 30, 40, 50 can be used as pre-fabricated permanent cladding panels formed using a natural binder mixed with water and aggregate plant materials and fibers. A wall or wall system can be formed by mounting a plurality of the panels 10, 20, 30, 40, 50 to a framing structure. For example, the wall can include opposing inner and outer panels and a mixed biocomposite material inserted between the panels. The mixed biocomposite material can include the same materials and compositions as the pre-fabricated panels. In other examples, the composition of the wet-mixed biocomposite material may be different from the composition of the panels. Desirably, compositions of panels and wet-mixed materials are selected to allow active fusing of the materials during curing, post installation. The mixed biocomposite material can be mixed at the work site (e.g., an in situ mixed biocomposite material composition). In other examples, the mixed biocomposite material composition can be pre-mixed and provided to a worksite in, for example, sealed plastic containers (e.g., a wet mixed biocomposite material).

Material Composition

In some preferred and non-limiting examples, the bioaggregate composition includes cellulose-rich short pieces or fibers, which may be referred to as bulk insulating fibers. For example, such bulk insulating fibers can be sourced from the fragmented inner core of an industrial hemp stalk known as shiv or hurd. Bulk insulating pieces or fibers can also be recycled wood chips of an appropriate size and shape. Bulk insulating pieces or fibers can also include short strong organic or inorganic pieces or fibers such as flax, kenaf, grasses, wood bark, or fiberglass. In a preferred and non-limiting embodiment or aspect, the bulk insulating pieces or fibers are about 2 mm to about 25 mm long. In some preferred examples, the pieces of cellulose and/or chaff are densely packed in the form of an aggregate having suitable strength and rigidity.

The bioaggregate composition for forming the panel(s) 10, 20, 30, 40, 50 also includes a natural binding cement employing at least one of hydraulic or hydrated lime, certain pozzolans, or other cementitious or active binding agents to agglomerate the components.

In a final cured state, the panels 10, 20, 30, 40, 50 are desirably of sufficient strength to be transportable and handled on a construction site without breaking or cleaving. The panels 10, 20, 30, 40, 50 also embody sufficient strength to support the weight of the mixed biocomposite material composition of the same or similar components filled between the installed panels until the material is set and melded together. In some cases, the panels 10, 20, 30, 40, 50 are dried completely before packaging and shipping from the production facility to provide a construction ready product on site.

In some examples, the bioaggregate composition for forming the panel(s) 10, 20, 30, 40, 50 also includes longer reinforcing fibers to enhance strength and rigidity of the panel(s) 10, 20, 30, 40, 50. In particular, to obtain sufficient strength for permanent shuttering use, the aggregate or mixture may incorporate strong organic or inorganic fibers, such as hemp, flax, kenaf, or fiberglass fibers, of a length that is about 2 to about 20 times the length of the cellulose chaff fragments, in the mix. The long organic or inorganic fibers may be about 4 mm to about 80 mm in length. Reinforcing fibers can be sourced, for example, from outside portions of a hemp stalk which surround the inner core portion thereof. In other examples, reinforcing fibers may be wood pieces of an appropriate length and width.

The reinforcing fibers can improve a matrix of cross-binding elements in the bioaggregate. For example, the reinforcing fibers may aggregate or combine together to form a tough woven fibrous meshwork within the panel body. In some examples, the reinforcing fibers are between about 1% and about 15%, preferably about 2% and about 15%, and more preferably 2% to 15%, by volume or by weight of the total amount of cellulose and/or chaff in the panel. The remaining about 85% to about 99% of cellulose and/or chaff by volume or by weight is made up of the above-described bulk insulating material (e.g., short cellulose and/or chaff pieces). The timing of mixing in the fibers, so as to keep them from balling up in the aggregate mix, is an important consideration. In order to address this issue and to preserve orientation and spacing of the fibers, long fibers may be introduced into the aggregate mix just before or during the pouring or casting of the panels.

In some examples, the panel(s) 10, 20, 30, 40, 50 can also include a reinforcing structure, such as a woven jute or fiberglass mesh formed from a cellulose-rich fiber material, such as hemp, straw, and others. The jute or mesh may be laid parallel to the face of the panel(s) 10, 20, 30, 40, 50 between the faces during casting or molding the panel(s) 10, 20, 30, 40, 50. The biocomposite aggregate mixture can be introduced to the mold and permitted to cure around the jute or mesh to form and a panel with enhanced strength and rigidity. In some examples, the woven jute or mesh can be first dipped, sprayed, brushed, or otherwise coated with water or a lime paste before being laid into the center of the panel to maximize adhesion.

Surface Coatings and Treatments

In some preferred and non-limiting embodiments, the outer surface(s) 10b, 20b, 30b, 40b, 50b of the panel(s) 10, 20, 30, 40, 50 also include features to enhance fusion between the panel and exterior wall finishes. Surface texture enhancements may also be used on the inner surface(s) 10a, 20a, 30a, 40a, 50a of the panel(s) 10, 20, 30, 40, 50 to improve adhesion with the bioaggregate filling. The textured surface can be applied to the panel(s) 10, 20, 30, 40, 50 during manufacturing by, for example, applying a textured coating to a finished panel. In other examples, the surface texture is enhanced during the molding or casting of the panel(s) 10, 20, 30, 40, 50 by using a mold having one or more textured surfaces which are imparted to the panel(s) 10, 20, 30, 40, 50. In other examples, the surface of the panel(s) 10, 20, 30, 40, 50 can be surface milled by a thickness sander employing a stiff wire brush roller, which leaves a more fibrous or hairy surface for the plaster or bioaggregate to grab. The surface of the panel(s) 10, 20, 30, 40, 50 can also be enhanced by a pressure rolling system to impress a series of longitudinal grooves on the surfaces. The outer surface and inner surface textures of the panels may be the same or different to suit requirements of different walls and wall systems.

For outer surfaces 10b, 20b, 30b, 40b, 50b, it may be important to consider excessive moisture protection. Certain biocomposites, such as hemperete, are known to shed water fairly well and need to be breathable. As such, standard moisture barriers, as required in most building codes, may not be advisable, although moisture-vapor breathable barriers, such as a barrier or coating formed by woven breathable plastic sheets (e.g., TYPAR® or TYVEK® wraps) will work. In cases where the exterior finish of a wall is solely lime-based stucco, exterior parts of a wall framing structure may require extra attention, by priming, painting, sealing, and/or flashing, to prevent moisture absorption by any wooden elements. For example, a stucco containing magnesium oxide as the main binder may be used to finish exterior walls in wetter locations. In certain climates, panels may be manufactured containing an amount of Portland or magnesium oxide cement to assist with water shedding and panel longevity. In other examples, in very wet climates where sides of buildings may experience driving rain for extended periods, exterior wood, metal, composite, or other cladding may be employed, as long as it is installed on furring strips affixed to the shuttering panel exterior face, leaving an air space for the biocomposite wall to breathe.

Panel Dimensions

The panels 10, 20, 30, 40, 50 can be any suitable size for installation as a shuttering element used in a building system to make cast in place walls. For example, the panels 10, 20, 30, 40, 50 may be manufactured in a thickness ranging from about 1 inch to about 4 inches. The width of the shuttering panels may range from about 12 inches to about 60 inches. The length of the panels 10, 20, 30, 40, 50 may range from about 24 inches to about 120 inches. In some examples, the panels 10, 20, 30, 40, 50 are manufactured to conform to standard framing dimensions to provide the most benefit and utility while minimizing cuts and wastage of material.

The panel(s) 10, 20, 30, 40, 50 may have a width/length ratio of about 1:2, which is believed to be the most useful shape for use at a work site. This shape allows the panel to be fixed horizontally or vertically to the framing such that the panel ends match over the course of an assembly. Example sizes for this 1:2 width/length ratio are 2 feet×4 feet, 3 feet×6 feet, and 4 feet×8 feet (e.g., the size of a standard sheet of plywood). Complimentary panels in a 1:1 ratio may also be made to work with the aforementioned sizes. Exemplary sizes of 1:1 ratio panels include 2 foot×2 foot×2 inches, 3 foot×3 foot×2 inches, and 4 foot×4 foot×2 inches.

In some instances, the panels 10, 20, 30, 40, 50 are cast or molded to size. In other cases, the panels 10, 20, 30, 40, 50 may also be extruded in sheets then cut or machined to size. For example, the panels 10, 20, 30, 40, 50 may be extruded as a substantially flat sheet having a uniform thickness of about 1 inch to 2 inches. The sheet can be cut or machined to size using conventional manufacturing processes as are known in the art.

Pre-fabricated panel(s) 10, 20, 30, 40, 50 are often delivered to a work site on a stacked pallet. Desirably, the panel(s) 10, 20, 30, 40, 50 should be lightweight so that they can be easily managed by hand at the work site, much like sheets of plywood. Biocomposite material in a 2-inch thick panel, for example, may have a weight per square foot of between roughly about 2.6 to about 4.7 pounds. Therefore, an example of the weight of a full panel may be approximately 40 pounds for a 16 inch×96 inch×2 inch panel, and approximately 65 pounds for a 3 foot×6 foot×2 inch panel. Beneficially, at this weight, the panel(s) 10, 20, 30, 40, 50 can be carried up a flight of stairs or passed up scaffolding.

Connecting Edges

According to another preferred and non-limiting embodiment or aspect, the biocomposite shuttering panels 10, 20, 30, 40, 50 may have a manufactured or machined edge profile by which the panels 10, 20, 30, 40, 50 can be interconnected or fastened together for greater wall integrity and to provide a smoother surface once installed, without having to match edges on studs as is done with drywall sheeting. In some cases, connections between adjacent panels 10, 20, 30, 40, 50 can include adhesives, pastes, or other bonding agents while being installed. Use of adhesives ensures a more permanent bond between the edges of the panels 10, 20, 30, 40, 50 and a more monolithic wall structure. Bonding the panels 10, 20, 30, 40, 50 is most important in places where the panel edges do not meet along a framing stud and in which weight of the wet biocomposite poured behind the panels 10, 20, 30, 40, 50 may cause the panels 10, 20, 30, 40, 50 to become uneven due to pressure of the wet biocomposite before it has set. However, such pressure is minimal compared to the pressure experienced from wet concrete. Different examples and embodiments of panel edge designs are described herein. However, it is understood that a variety of different types of grooves, connectors, and edges as are known in the art may be used for establishing a secure and aesthetically pleasing connection between adjacent panels.

For example, in a preferred and non-limiting embodiment or aspect, the panel(s) 10, 20, 30, 40, 50 can include a regular series of pockets, slots, or voids routered or manufactured along perimeter faces of the panel to allow a wood-biscuit or another connector to be placed between sides of adjacent panels during installation. In some examples, the pockets can be half-biscuit sized pockets configured to receive a corresponding biscuit. The biscuit can be formed from any suitable material including plastic, laminate, cementitious fiber, wood, resin, and/or composite fibers.

In other preferred and non-limiting embodiments or aspects, the panels 10, 20, 30, 40, 50 can be provided with a universal groove on all side surfaces of the panel, designed to allow the panels 10, 20, 30, 40, 50 to accommodate splines of wood or other material, as a connector between panels 10, 20, 30, 40, 50 abutting in any direction and forming a consistent, smooth, and unfinished wall surface.

In other preferred and non-limiting embodiments or aspects, the panels 10, 20, 30, 40, 50 comprise an exposed V-shaped or U-shaped tongue on two adjoining ends of the panels 10, 20, 30, 40, 50 and matching V-shaped or U-shaped grooves on the diagonally opposite two adjoining ends. The exposed tongues and grooves allow joint-connected panels 10, 20, 30, 40, 50 along the direction of the wall framing, thereby forming a smooth, consistent unfinished wall surface on the inside and/or outside of the structure extending across the wall framing.

In other preferred and non-limiting embodiments or aspects, the panels 10, 20, 30, 40, 50 comprise a half-thickness rabbet profile on two adjoining ends on one side of the panel and on the other two adjoining ends on the other side of the panels 10, 20, 30, 40, 50 so as to form a bidirectional shiplap connection between abutting panels.

In other preferred and non-limiting embodiments or aspects, the panels 10, 20, 30, 40, 50 comprise a half thickness rabbet profile along the two opposing lengthwise edges of the panel only, designed to allow abutting panels to either overlap each other longitudinally, or such that each panel 10, 20, 30, 40, 50 sits inside the framing by the depth of the rabbet profile and connect along the widest edge of the rabbet profile.

In other preferred and non-limiting embodiments or aspects, the panels 10, 20, 30, 40, 50 comprise a full edge frame including a glass fiber reinforced composite material or similar materially strong fibrous resin or plastic composite material to provide structural framework and rigidity to the panels 10, 20, 30, 40, 50. The panels 10, 20, 30, 40, 50 can also include grooves, connectors, cam-locks, or joints for installing and/or connecting a panel to an adjoining panel.

A number of these exemplary embodiments of the shuttering panel edge and how the panels may be assembled into a complete wall system are now described in detail with reference to FIGS. 1-5.

Figure 1A:
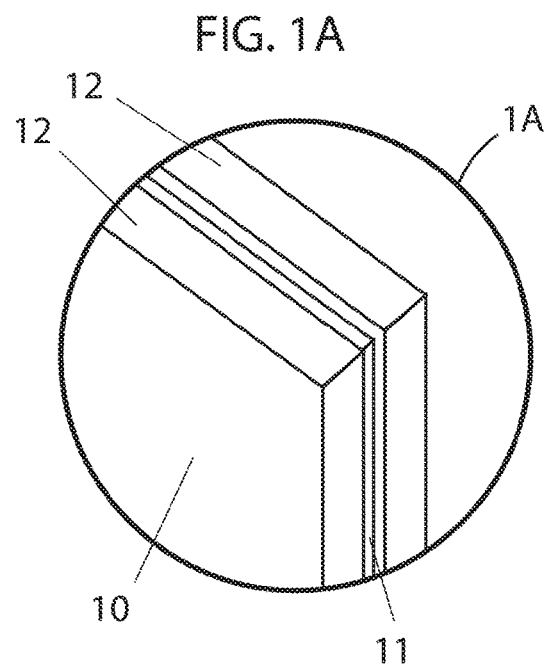
FIG. 1A is a perspective view of a portion of the panel of FIG. 1 enclosed by circle 1A.

As shown in FIGS. 1 and 1A, the panel 10 includes a manufactured square groove 11 around the entire edge 12 thereof. The width of the groove 11 may be uniform, centered on the edge 12 of the panel 10 and may be of a width measuring from ⅛ inch to ¾ inch and a depth measuring from ½ inch to 3 inches, with an example cross sectional size measuring ¼ inch wide and 1 inch deep. This particular embodiment lends itself most easily to any changes in panel direction from horizontal to vertical installation, which may be required due to cut shapes, as explained later in connection with the description of FIG. 6.

Figure 1B:
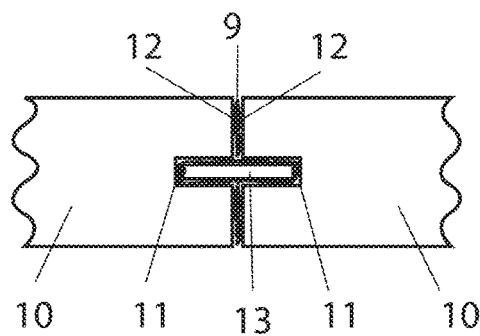
FIG. 1B is a top view of a portion of a wall including two panels connected together with a spline according to an aspect of the disclosure.

As depicted in FIG. 1B, the groove 11 is sized and shaped to accept a splines 13. The strips or splines 13 can be formed from any suitable material including wood, plastic, laminate, and/or resin. The spline 13 may be inserted into the groove 11 and secured by applying lime paste 9, adhesive, screws, nails, or other fastener into the grooves 11 between panels 10 abutting in any direction. Beneficially, this arrangement ensures that the faces of the panels 10 remain flush with one another and strength is maintained between abutting panels 10, much like biscuit jointed wood. In some examples, the spline 13 is a strip of wood or composite material having a length substantially equal to a length of a side 15 minus depth of two grooves 11. The spline 13 width is substantially equal to a width 16 of the panel minus the depth of two grooves 11, as shown in FIG. 1. These dimensions help to prevent any interference of the splines 13 in the grooves 11 at the corners. For the exemplary groove sizes described above, the matching splines 13 have a cross-sectional dimension of about ¼ inch×1⅞ inches.

FIG. 2 and FIG. 2A depict a biocomposite shuttering panel 20 showing machined or manufactured pockets or slots 21 around the entire edge 22 of the panel 20. The pattern of the slots 21 may be uniform, centered on the edge 22 of the panel 20. The slots 21 may be about ⅛ inch to about 1 inch wide and about 1 inch to about 5 inches long. The slots 21 may have a cross section of about ½ inch wide and 3 inches long. This particular embodiment lends itself most easily to rapid panel connections due to smaller-sized splines to be matched up in the slots, especially when using adhesives to bond the biscuits in the panels.

As depicted in FIG. 2B, the slot 21 accepts a wooden, or other material, biscuit 23 that may be simply inserted into the slot 21 and/or may be secured in place using lime paste 9, adhesive, screws, nails, or other fasteners inserted into at least a portion of the slots 21 between adjacent panels 20 abutting in any direction. This arrangement may ensure that the faces of the panels 20 remain flush with one another and strength is maintained between abutting panels 20, much like biscuit jointed wood. As depicted in FIG. 2C, the connecting biscuit 23 can be a standard oval shape, which fits snugly in the machined or routered slots.

FIGS. 3, 3A and 3B depict the biocomposite shuttering panel 30 with a machined or manufactured V-groove 31 along two adjoining edges 32 thereof. Opposite two adjoining edges 33 have a V-tongue 34 extending out from the panel edge 33. The V-tongue 34 is sized and shaped with matching dimensions to fit snugly in the V-groove 31. In other examples, the groove 31 can have a U-shaped cross section as shown, for example, in FIG. 3D.

The V-tongue 34 may be about ⅕ to about ½ of the overall panel 30 thickness and preferably about ⅓ of the edge 33 dimension. The overall protruding dimensions of the V-tongue 34 are slightly less than the overall depth dimension of the V-groove 31 to prevent the V-tongue 34 from binding in the V-groove 31, thereby preventing the panel edges 32, 33 from abutting tightly. For example, a depth of the groove 31 can be about ¾ inch.

As shown in FIG. 3C, the V-tongue 34 and V-groove 31 fit together snugly and can be fastened using a lime paste 9, adhesive, screws, nails or other fasteners to ensure the faces of the panels 30 remain flush with one another and that strength is maintained between abutting panels 30. This method of panel connection is similar to methods for laying wooden flooring and reduces an amount of time needed for installing slats between the panels 30.

Figure 4:
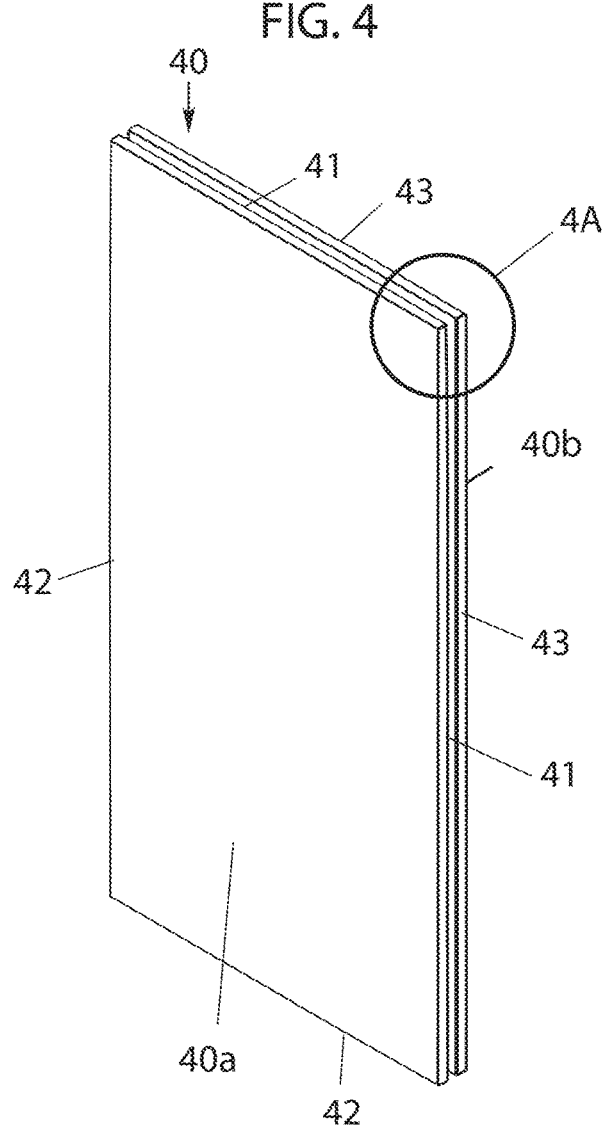
FIG. 4 is an isometric perspective view of another embodiment of a shuttering panel having an overlap profile to match on opposing edges according to an aspect of the disclosure.
Figure 4A:
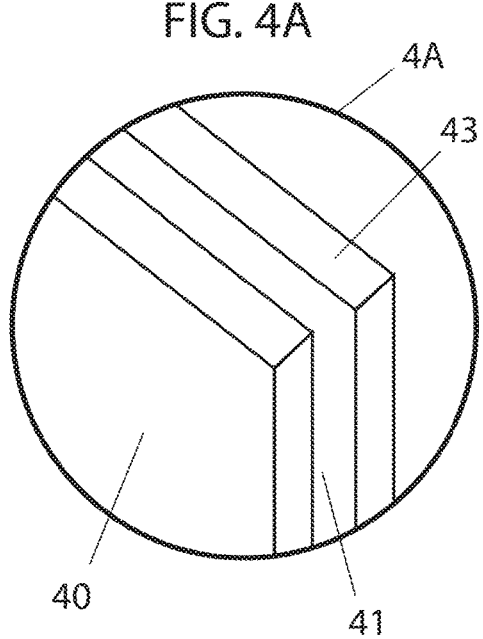
FIG. 4A is a perspective view of a portion of the panel of FIG. 4 enclosed by circle 4A having a rabbet defining an overlap profile for the edge thereof.

FIG. 4 and FIG. 4A depict the biocomposite shuttering panel 40 with a machined or manufactured rabbet 41 intended for forming a shiplap connection between abutting panels 40. The rabbet 41 is of a square profile with sides of a dimension that is half the dimension of the panel 40 thickness. The rabbet 41 is on one side of the panel 40 for two adjoining edges of the panel 40, and is on the reverse side of the panel 40 for the opposite two adjoining edges 43 of the panel 40.

Figure 4B:
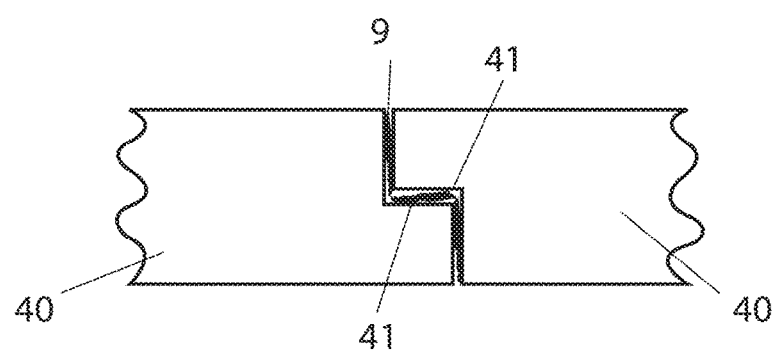
FIG. 4B is a top view of a portion of a wall including two panel edges connected together along respective edges in an overlap manner.

As shown in FIG. 4B, this panel edge profile may be installed dry or may be fastened using a lime paste 9, adhesive, screws, nails or other fasteners to ensure that the faces of the panels 40 remain flush with one another and that strength is maintained between abutting panels 40.

FIG. 5 and FIG. 5A depict the biocomposite shuttering panel 50 having a machined or manufactured rabbet 51 along two parallel longitudinal edges 52 of the panel 50. The rabbet 51 has a square profile with sides of a dimension that is half the dimension of the panel 50 thickness. This panel edge profile may preferably be used when a panel width 52 is of a dimension that fits between framing studs, such as 10.5 inches, 14.5 inches, or 22.5 inches, and is of a length 53 to fit within standard ceiling heights, such as 8 feet, 9 feet, or 10 feet.

As depicted in FIG. 5B, in this embodiment, the panel 50 can be installed vertically to a wall framing structure consisting of a plurality of elongated studs 8 with outside panel edges 55 of abutting panels 50 meeting on the framing structure. Installing the panel 50 to the framing structure in this way places the interior of the framing structure closer to the surface of the wall for easier detection, which, potentially, yields a greater racking strength for the building.

Modular Wall Assembly and Building System

Figure 6:
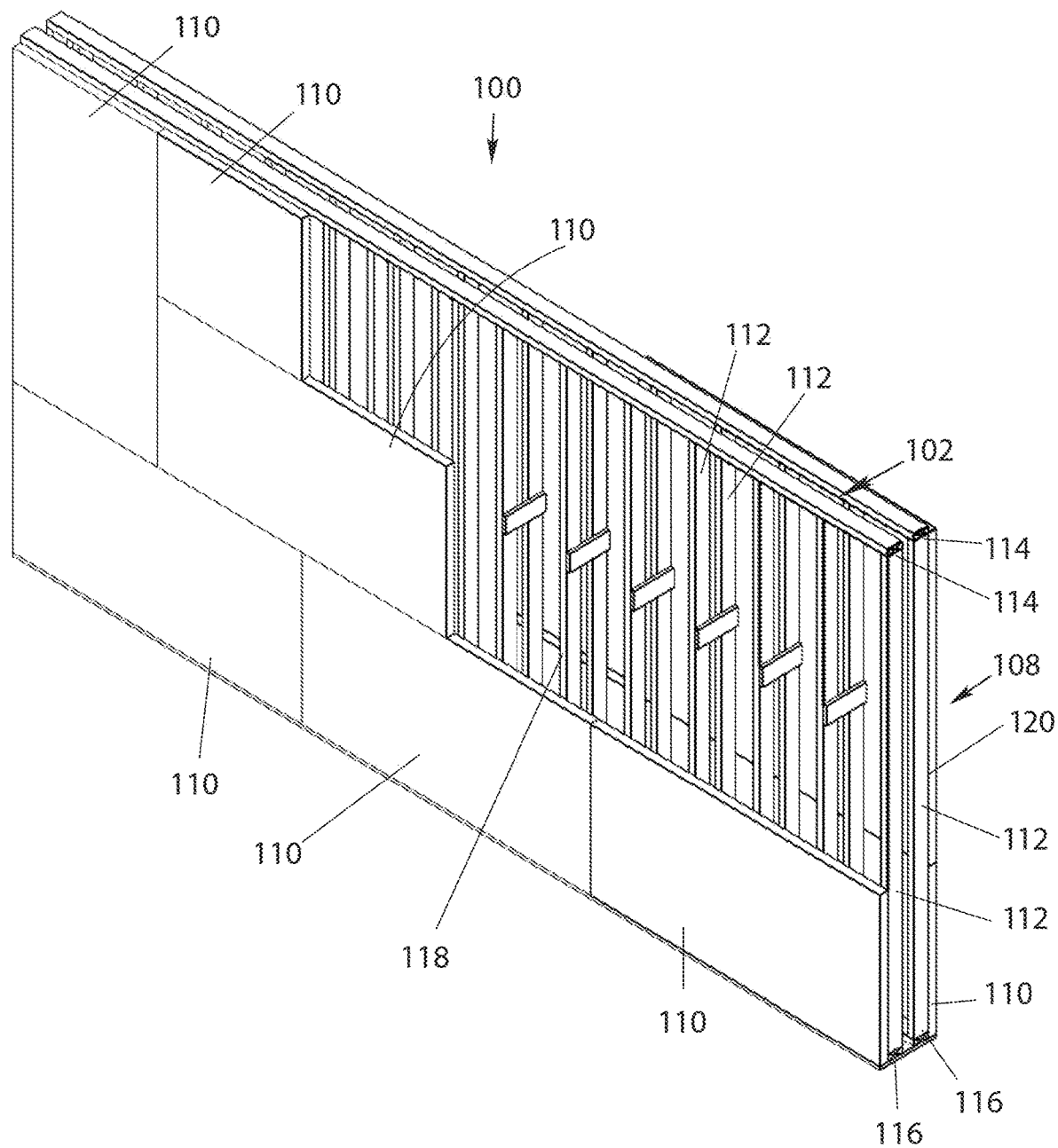
FIG. 6 is an isometric perspective view of a wall illustrating an exemplary pattern for arranging shuttering panels on a standard double 2×4 wall framing.
Figure 7:
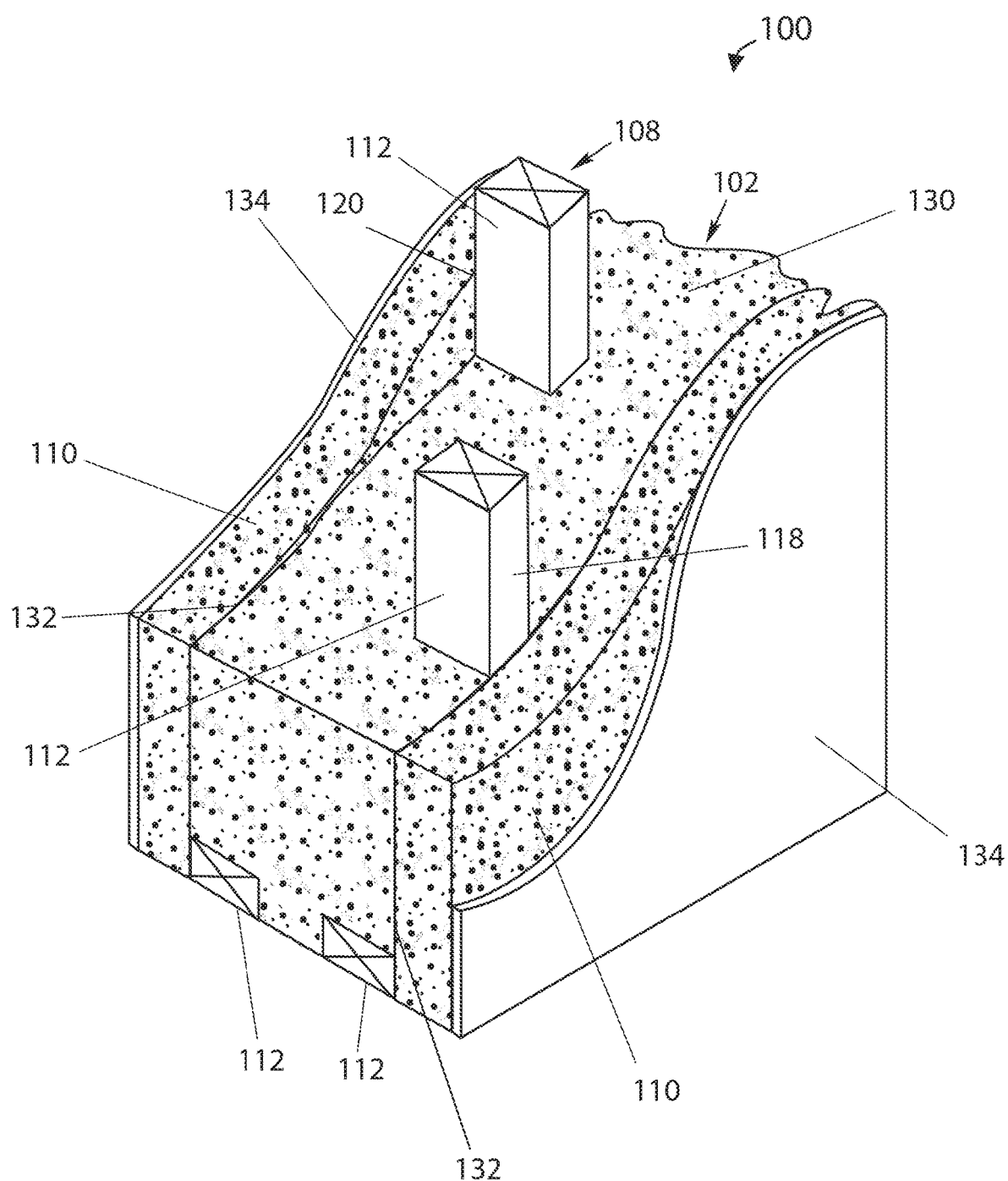
FIG. 7 is a cross-sectional view of a portion of a completed wall including biocomposite shuttering panels on the outside faces of the double 2×4 framing with a biocomposite material filling a wall cavity between the panels and a plaster finish applied on the interior and the exterior of the complete wall according to an aspect of the disclosure.

FIGS. 6 and 7 depict a preferred and non-limiting embodiment or aspect of a wall or modular wall assembly 100 formed from a plurality of biocomposite shuttering panels 110 mounted to a frame or framing structure 108. Panels 110 can be any of the composite panel structures described herein and shown, for example, in FIGS. 1-5. The framing structure 108 includes a plurality of linearly arranged elongated studs 112 having a top end 114, a bottom end 116, and a first longitudinal side 118 and a second longitudinal 120 side extending between the respective ends.

As shown in FIGS. 6 and 7, a first set of shuttering panels 110 is installed in a running bond pattern across the framing structure 108. For example, the first set of panels can be mounted to the first longitudinal side 118 of the plurality of studs 112. A second set of shuttering panels 110 is installed on the opposite side of the studs 112. For example, the second set of panels 110 can be mounted to the second longitudinal side 120 of the plurality of studs 112. This arrangement creates a cavity 102 between the two sets of panels 110. In accordance with an aspect of the present invention, the cavity 102 can be filled on site with the mixed biocomposite 130 (shown in FIG. 7) (e.g., with a pre-made wet mixed biocomposite material or with an in situ mixed biocomposite material) to form an insulating layer. In some examples, the composition of the mixed biocomposite 130 is similar to the panels 110, but less dense. As previously discussed, the composition of the biocomposite 130 is selected to actively fuse at an extended interface 132 (shown in FIG. 7) with inner surfaces of the panels 110. In some configurations, inner surfaces of the panels 110 may be prefinished at the factory with a scratch or textured coating to enhance adhesion between the mixed biocomposite 130 and the panels 110. Outer surfaces of the panels 110 may also be scratched or textured to enhance adhesion between an outer surface of each panel 110 and a final smooth plaster finish 134 (shown in FIG. 7) on site.

In some examples, the panels 110 are fastened to the plurality of studs by conventional framing and wall anchoring techniques. For example, the panels 110 may be attached to the studs 112 by fasteners, including but not limited to, screws, nails, and/or rivets. Nails can be spaced using a common spacing pattern, such as about every 3 inches to 8 inches. The connection between the panels 110 and studs 112 can be enhanced by adhesives or binders. One type of fastener, which can be used with the panels 110 is a ceramic-coated 3-inch deck screw. The screws can be inserted through the face of the biocomposite panels 110 and countersink into the panels 110 on their own, holding the panels 110 tightly to the framing structure 108. Screws may be used, for example, in a high density (e.g., every 3 inches to 8 inches) spacing pattern on every framing stud over which the panel 110 passes. The head of the screws can be touched up with a putty or caulking to a fairly smooth cover and permitted to dry, much like touching up drywall screws with drywall joint compound, before a finishing coat of lime plaster is applied to the panel 110.

In other examples, the panels 110 are mounted to the framing structure 108 by an adhesive or moisture-cure urethane. In order to set or cure the urethane, the panels 110 may be tacked to the framing structure 108 using nails driven by, for example, a pneumatic nail gun, using a low density pattern of galvanized nails to hold the panels 110 in place until the adhesive dries. A low density pattern of galvanized nails can be spaced every 6 inches to 18 inches along a stud. In cases where the cavity 102 between sets of panels 110 is filled before the adhesive between the panels 110 and framing structure 108 dries or fully cures, the shuttering panels 110 may be held more firmly in place by screwing temporary plywood blocking against the faces of the panels 110 to hold them firmly against studs of the framing structure 108. The blocking can be removed once the adhesive and biocomposite fill set, which usually takes about 24 to 48 hours. In cases where a denser fill material is used, panel edges that do not meet at or near framing studs may be strengthened by attaching (e.g., screwing) blocking (e.g., plywood squares) across the panel edges on the backside of the panels 110.

In a preferred and non-limiting embodiment or aspect, the wall assembly 100 may also include at least one porous structural layer or sheet positioned between the panels 110 and the biocomposite material 130. The structural layer is porous so that the biocomposite material 130 can fuse to the panels 110 through the structural layer to impart additional strength and rigidity thereto. The porous structural layer or sheet may be useful, for example, in earthquake prone areas to comply with local building standards and to protect walled structures from damage or collapse. The porous structural layer may also increase security by, for example, making it more difficult for intruders to gain access to a building by breaking a hole through a wall. The porous structural layer can be, for example, a metal mesh formed from galvanized steel or chicken wire. The mesh may have a size of about 2 inches or less. The mesh is connected to the framing structure 108 using known fastening techniques. For example, the metal mesh may be stapled directly to the studs 112 of the framing structure 108. As described above, the panels 110 are also mounted to the studs 112 such that the metal mesh or security layer is positioned between the studs 112 and panels 110. The mixed biocomposite material 130 is placed in the cavity 102 and permitted to fuse to the panels 110 in the manner described hereinabove.

Method of Forming a Biocomposite Panel and Wall

Figure 8:
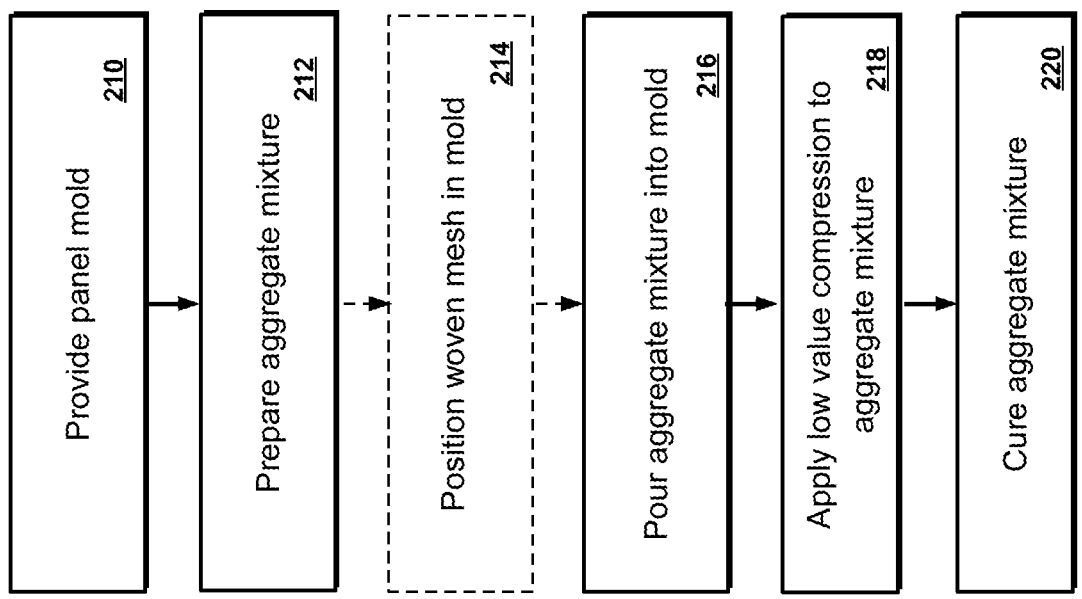
FIG. 8 is a flowchart illustrating a method of manufacture for a composite panel according to an aspect of the disclosure.
Figure 9:
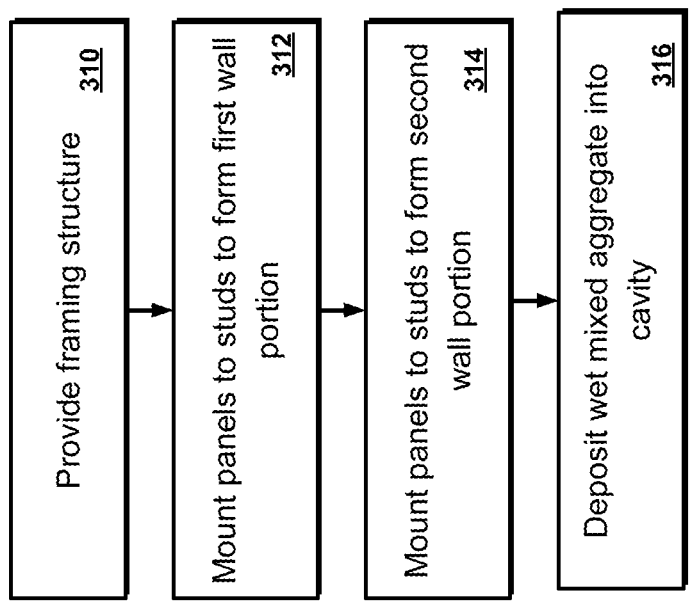
FIG. 9 is a flowchart illustrating a method for forming a wall from a plurality of composite panels according to an aspect of the disclosure.

According to another preferred and non-limiting embodiment or aspect, methods for forming a biocomposite panel and for constructing a wall from a plurality of composite panels are shown in FIGS. 8 and 9.

In some preferred and non-limiting embodiments or aspects, the panels are installed in conjunction with current construction and wood-framing practices to provide dense and strong wall surfaces attached to opposing sides of building framing, creating a cavity between the two shutters. The panels may also be used with current framing methods to complete a dense and strong ceiling surface above which a cavity is created. As previously described, for a complete monolithic wall structure, cavities are then completely filled with the mixed biocomposite material composition of lighter, more insulating density, which desirably fuses and crystallizes at interfaces of the biocomposites to form a unified mass wall. In other examples, biocomposite panels can be installed to a wall frame and filled with other suitable combinations of materials with good insulating properties. However, walls filled with other materials may not provide the superior performance and rigidity of the mixed biocomposite material composition.

FIG. 8 illustrates a molding method for forming a biocomposite wall panel in accordance with the present invention. As shown at step 210, a panel-shaped mold is provided. As previously discussed, the panel can have about a length/width ratio of about 2:1. The panel can be a standard size, such as 16 inches×96 inches×2 inches or 3 feet×6 feet by 2 inches.

As shown at step 212, a biocomposite aggregate mixture is prepared. As previously described, the bioaggregate mixture can include short pieces or fibers of cellulose and/or chaff, which function as bulk insulating fibers. The aggregate mixture can also include longer reinforcing fibers for providing increased strength and rigidity for the panel. The mixture also includes a binder material, such as hydraulic lime.

As shown at step 214, optionally, a woven jute or mesh can be provided to the mold. For example, the mesh can be a woven pad formed from long natural fibers. Using a woven mesh further enhances structural properties of the manufactured panels. Once the woven mesh is in place, as shown at step 216, the aggregate mixture is poured into the mold. For example, the mixture can be poured over the mesh or mat so that the mixture cures around the mesh or mat.

As shown at step 218, compression is applied to the mold and mixture to seat the mixture within the mold. As shown in FIG. 8, in a preferred example, the compression applied to the mixture is a low value compression. Low value compression can include gently shaking or oscillating the mold to ensure that the mixture is evenly dispersed through the mold. Low value compression can also include applying light pressure to the surface of the mixture using, for example, a pressing plate or board. As shown at step 220, after the mixture is seated in the mold, it can be cured to form the pre-fabricated wall panel.

A method for mounting the panels to a framing structure or wall framework to form a wall is shown in FIG. 9. For example, the method can be used for attaching permanent shuttering panels to a building framework to provide a substantially secure wall facing on both sides of the framing or ceiling and an internal cavity for filling. The cavity can be filled with a mixed biocomposite to form a complete monolithic wall system.

As shown at step 310, a wall frame or framing structure is provided. The frame or framing structure can include a plurality of linearly arranged elongated studs having a bottom end, a top end, and a first longitudinal side and a second longitudinal side extending therebetween. As shown at step 312, biocomposite shuttering panels are mounted to a first side of the elongated studs to form a first wall portion. There are a variety of familiar hand and power tools that can be used for the installation of these panels. In some examples, the shuttering panels can be cut, sawn, milled, routered, or modified to size to conform to the shape of the frame or framing structure, as well as to accommodate spaces for the doors and windows, electrical service cutouts, holes for plumbing pipe, and any other openings. The panels can be cut using an appropriate standard saw blade on a sturdy table saw, a hand-held circular saw, or another type of saw appliance. To get an accurate fit on small cut-outs at the edges of panels to fit in corners or around joists, a handsaw or hammer and chisel can be used. To cut out circles and rectangles for pipes and electrical boxes, a router or trimmer with a long straight router bit can create the shapes that are needed in the center of a shuttering panel. Generally, building plumbing and electrical work is planned and roughed-in before the shuttering panels are attached to both sides of the frame or framing structure. In most instances, one side of the wall is partially or completely shuttered, preferably but not always the exterior wall, and then plumbing and mechanical work can commence from the interior of the building.

In some instances, considerations are made for the fact that the face of the wall is about 2 inches off the front of the framing studs, rather than the current ½ inch, ⅝ inch, or ¾ inch for standard drywall. In the case of plumbing or gas fitting, this means the PVC or other piping is extended further beyond the face of the wall for future work in connecting the plumbing fixtures. For electrical work, the electrical boxes need not be installed or fastened to the studs, but only electrical wiring, encased in galvanized sheathing, needs to be run from terminal locations back to the electrical panel. As long as the wiring is passed through the shuttering panels at the point of attachment to the framing, the electrical box holes can be routered and boxes installed after the biocomposite is filled to prevent biocomposite from exiting the wall cavity or packing holes during filling. Another option is to utilize non-standard deep electrical boxes affixed to the wall structural elements and fit the panels around them prior to filling the cavity.

In some examples, surfaces of the panels can be scratch coated or textured at a work site either before or after they are mounted to the wall frame or framing structure. As previously discussed, texturing can be used to improve adhesion between the panel surface and an applied plaster layer, which enhances a smooth wall or ceiling finish. Alternatively, panels may come supplied from the factory with a scratch coat prefinished face of the panel to allow for better adhesion of plaster finishes.

In some instances, the shuttering panels are only installed on one side of the structural wall framing. For example, the shuttering panels can be installed on the underside of ceiling joists, to allow lightweight and insulating biocomposite, or other insulating material to be added above for insulation between floors or in attic or roof spaces. Once the panels are installed to one side of the framework, a biocomposite or similar composition can be sprayed to fill the cavity formed by the panels and framing structure. After the biocomposite material is sprayed, shuttering panels or other breathable wall boards, such as magnesium oxide boards, are used to finish the wall assembly. However, installing panels on only one side of a wall framing may provide less favorable assembly characteristics.

Alternatively, after the first side of the wall is formed, as shown at step 314, a plurality of wall panels is next mounted to the second side of the elongated studs to form a second wall portion. The second wall portion is generally formed in the same manner as the first wall portion described above. For example, individual panels can be sized and shaped on site to fit on the framing structure and/or to accommodate doors, windows, and other items.

Forming the second wall portion often occurs at the same time or in an alternating pattern with infilling of the cavity between wall portions. For example, a bottom row of panels may be mounted to the elongated studs to form a first row of the second wall portion. After the first row is formed, as shown at step 316, a composition, referred to herein as a mixed aggregate (wet mixed or mixed in situ), of cellulose and/or chaff and at least one binder is deposited into the cavity between the wall portions up to the top of the first row. For example, the in situ aggregate composition can be poured into the cavity and hand packed to ensure good dispersion of the aggregate composition within the cavity. Alternatively, the aggregate composition can be sprayed into the cavity. Once the aggregate composition is in place, it is allowed to fuse to the panels to create a cast-in-place complete biocomposite wall. Once the cavity is filled to the top of the first row, a second row of panels can be mounted to the elongated studs and the infilling process can be repeated.

The mixed, biocomposite can be the same material and composition as the panels or can be a different material and/or composition from the panels. The panels and infill are designed to promote strong fusion through crystallization at the adjoining surfaces to create a single, unified dynamic wall material surrounding the wall framing. As previously described, in some preferred examples, the wall panels can be formed from a biocomposite material having a first density and the mixed aggregate can be formed from a second material having a second density, the first density being greater than the second density.

In other examples, the shuttering panels can be installed from the bottom in horizontal rows in order for the filler biocomposite to be hand packed and poured or sprayed in from the side of the wall, row by row. In some embodiments, the composition of the wet infill biocomposite undergoes an active curing process such that the infill fuses permanently through chemical bonding over time to the cladding panels and creates an integrated monolithic wall structure.

The unique properties of this invention allow for many combinations of embodiments and materials to achieve a superior hybrid biocomposite monolithic wall system using a factory produced permanent wall shuttering system, which achieves some or all the benefits of the traditional biocomposite wall having additional benefits of reduced installation and drying times compared with current practices.

Discussion of this invention is made in relation to use in the building industry, but it is appreciated that the invention described herein is not limited or exclusive of the building industry. While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof. Further, although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. Accordingly, the foregoing description is intended to be illustrative rather than restrictive.

The invention claimed is:

1. A wall assembly comprising:
a frame configured to be a vertical loadbearing building framework, the frame comprising a plurality of linearly arranged elongated studs having a top end, a bottom end, and a first longitudinal side and a second longitudinal side extending between respective ends; and
a monolithic wall configured to be non-loadbearing, the monolithic wall comprising:
a first wall portion mounted to the first longitudinal side of the elongated studs of the frame, the first wall portion comprising a plurality of interconnected wall panels having a density of 250 kg/m$^3$ to 450 kg/m$^3$;
a second wall portion mounted to the second longitudinal side of the elongated studs; and
an insulating layer formed from a wet mixture of pieces of cellulose and/or chaff and a first amount of a binder inserted within a cavity between the first wall portion and the second wall portion,
wherein the insulating layer is less dense than the interconnected wall panels and is fused through crystallization to at least a portion of the first wall portion, thereby forming the monolithic wall,
wherein each of the interconnected wall panels has a front surface forming an exterior face of the first wall portion, a rear surface mounted to one or more of the elongated studs, and side surfaces extending between the front and rear surfaces, the side surfaces being connected to side surfaces of adjacent wall panels to form the first wall portion,
wherein the plurality of wall panels of the first wall portion comprise a cured composition comprising pieces of the cellulose and/or chaff and a second amount of the binder, and
wherein the binder comprises at least one of hydraulic lime or hydrated lime.

2. The assembly of claim 1, wherein at least one of the side surfaces of the wall panels comprises a longitudinal groove, and wherein the assembly further comprises an elongated connector mounted within the grooves of adjacent interconnected panels to form a secure connection between the adjacent panels.

3. The assembly of claim 2, wherein a portion of the binder is at least partially disposed within the groove for mounting the elongated connector within the groove.

4. The assembly of claim 1, wherein the cured composition of the interconnected wall panels further comprises cellulose and/or chaff reinforcing fibers, and wherein the reinforcing fibers have an average length at least two times greater than an average length of the pieces of the cellulose and/or chaff of the interconnected wall panels.

5. The assembly of claim 4, wherein at least a portion of the reinforcing fibers are dispersed within the wall panel to form a fiber matrix.

6. The assembly of claim 4, wherein the reinforcing fibers comprise at least one of the following: hemp fibers, kenaf fibers, flax fibers, grass, straw, wood bark, wood, glass fibers, or any combination thereof.

7. The assembly of claim 4, wherein the pieces of the cellulose and/or the chaff of the interconnected wall panels have an average length of between about 2 mm and about 25 mm, and the reinforcing fibers have an average length of between about 4 mm and about 80 mm.

8. The assembly of claim 1, wherein the pieces of cellulose and/or the chaff of the interconnected wall panels and/or of the insulating layer comprise fragmented woody material obtained from at least one of the following: hemp, straw, kenaf, flax plants, grass, wood bark, wood, or any combination thereof.

9. The assembly of claim 1, wherein, prior to crystallization of the panels and the insulating layer, the wall panels of the first wall portion have a thickness of about 1 inch to about 4 inches.

10. The wall assembly of claim 4, wherein the reinforcing fibers are about 2% to about 5% of the total cellulose and/or chaff composition of the wall panel.

11. The wall assembly of claim 1, wherein the second wall portion comprises a second plurality of interconnected wall panels having a front surface forming an exterior face of the second wall portion and a rear surface mounted to the second side of the elongated studs of the frame, and wherein the insulating layer is fused to the second wall portion through crystallization, such that the monolithic wall structure includes the first wall portion, the insulating layer, and the second wall portion.

12. The wall assembly of claim 1, wherein the insulting layer is fused to the interconnected wall panels by a crystallization process in which the first amount of the binder and/or the second amount of the binder undergo a chemical transformation which produces a crystallized mass.

13. The wall assembly of claim 1, wherein the plurality of fasteners comprise at least one of screws, nails, or rivets.

* * * * *